Sept. 5, 1944.   O. E. ESVAL ET AL   2,357,319
FLUX VALVE MAGNETIC COMPASS
Filed Nov. 20, 1940
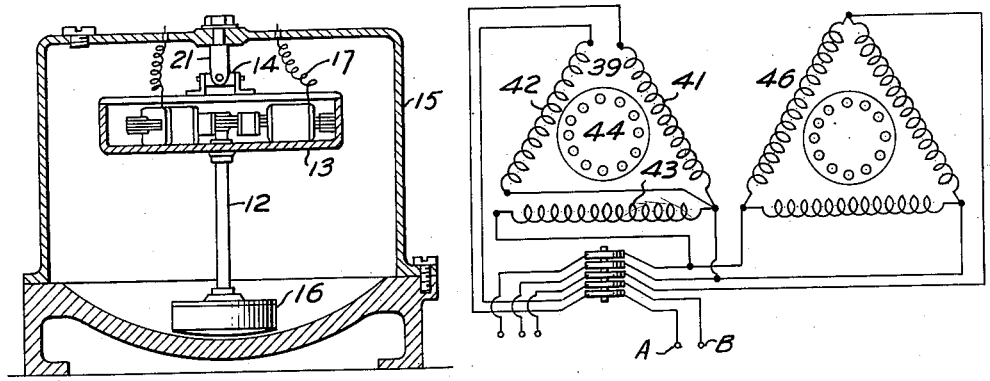
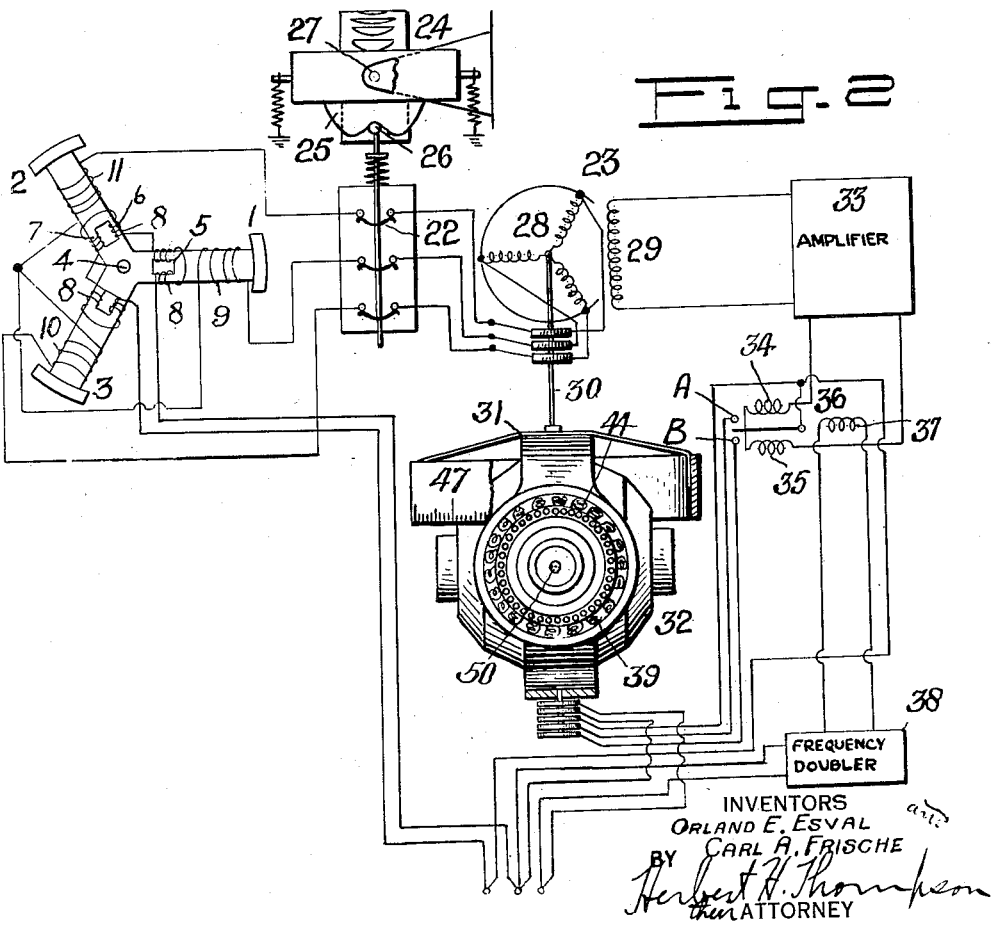
INVENTORS
ORLAND E. ESVAL
CARL A. FRISCHE
BY Herbert H. Thompson
their ATTORNEY Patented Sept. 5, 1944

2,357,319

UNITED STATES PATENT OFFICE 2,357,319

FLUX VALVE MAGNETIC COMPASS

Orland E. Esval, Allendale, and Carl A. Frische, Leonia, N. J., assignors to Sperry Gyroscope Company, Inc., Brooklyn, N. Y., a corporation of New York Application November 20, 1940, Serial No. 366,370

10 Claims. (Cl. 33—222)

This invention relates broadly to the art of magnetic compasses and, more particularly, to the type of earth's magnetic field direction indicator in which stationary magnetic permeable cores are subjected to the earth's magnetic field and are also excited to or near the saturation point by alternating or pulsating currents, the earth's magnetic field operating to vary the currents induced in secondary windings on said cores by virtue of the non-linear magnetic characteristic in accordance with the relative direction of the cores in the earth's field. Such a compass is broadly described in the patent to Haig Antranikian, No. 2,047,609, dated July 14, 1936, for Magnetic field direction and intensity finder and may be referred to as a flux valve inductive magnetic compass.

A further improvement in this type of compass is shown in the more recent patent application of Lennox F. Beach, Serial No. 348,582, for Direction indicator for magnetic fields, filed July 30, 1940.

According to this invention, three such flux cores are placed in the earth's field at equi-angles to each other so that the output E. M. F. of the secondaries varies in a manner similar to the output of the well known Selsyn transmitter, and the output is used to actuate one or more repeater compasses through the ordinary Selsyn repeater motors. Such a system, however, gives uncertain readings because any slight change in the plane of the compass results in a large deviation of the repeater and, second, because such changes take place so rapidly in a rolling ship or airplane that the repeater compass card may oscillate quite rapidly, so as to render it difficult to take readings.

According to our invention, we have overcome these difficulties in a simple manner by mounting the inductive compass on a pendulum, so that its average position will be vertical, and by providing a long period integrating or averaging device at the repeater compass. For the aforesaid purpose, we prefer to employ a slave directional gyroscope which is slowly coerced from the inductive compass so that it assumes a position in accordance with the average strength of the signals received from the inductive compass. In case the aircraft is equipped with an automatic pilot about all three axes, the pendulous mounting of the inductive compass may be eliminated.

Referring to the drawing, showing two forms our invention may assume,

Fig. 1 is a side elevation, with parts broken away, showing our inductive compass mounted on a damped pendulum.

Fig. 2 is a wiring diagram showing our improved integrating compass using a slave gyroscope.

Fig. 3 is a wiring diagram showing the wiring of both the spinning motor and the torque motor of the directional gyroscope.

Our flux valve induction compass, per se, may consist merely of, for example, three cores of material of high permeability placed horizontally and preferably arranged at equi-angles so as to generate potentials proportional to the horizontal components of the earth's field. As an example, the three cores or pole pieces 1, 2 and 3 extend from a common center 4 at 120° angles with one another for measuring the components of the field in the direction of their respective axes. Each core is shown as having a cut-out portion 5 forming two short legs 6 and 7, around each of which is placed connected coils 8 excited from one phase of an A. C. supply S. The several pairs of coils on each pair of legs may be connected in series, as shown and the coils of each pair are so connected as to circulate a flux in a closed magnetic path around the cut-out portion in each core and the current magnitudes are so proportioned as to bring the magnetic flux through the legs to near the saturation point on the peaks of the A. C. Each core also has a pick-up or secondary winding 9, 10, 11, which may be Y connected and which may lead to the compass proper.

As shown, the induction compass or inductor is preferably mounted on or in a pendulum 12 so as to maintain its average position horizontal. The inductor is shown as enclosed in a liquid-tight container 13 which in turn is suspended on a universal joint 14 from a shaft 21 supported in the top of the outer casing 15, which may be filled with damping liquid, such as oil. The whole is shown as made pendulous by a mass 16 secured to the bottom of the container 13. Flexible wires 17 are shown as leading current into and out of the container 13.

While the average position of the pendulum will remain vertical during uniform flight in a straight line, the pendulum will of course swing out on turns or other acceleration and we prefer to disconnect the inductor compass from the indicator at this time. For this purpose, we have shown a switch 22 interposed between the inductive compass and the receiver device 23, which is normally biased to a closed position but which is opened by a rate of turn or turn indicator type gyro 24 whenever the aircraft turns. A simple means of accomplishing this purpose is to mount a heart-shaped cam 25 on the rate of turn gyro, the switch having a roller 26 normally resting in the low portion of the cam. The precession of the rate gyro, therefore, in either direction about its axis 27 will open the switch as long as the turn persists.

Instead, however, of actuating a repeater compass from the signal from the inductive compass, we prefer to interpose an integrating device such as a slave directional gyroscope which is coerced from the inductor. Since our invention as herein disclosed relates to a gyro-magnetic compass system, per se, as compared to an automatic pilot, it is necessary that the control be of the repeat-back or two-way type. A very simple means to this end is to place in a circuit with the windings 9, 10 and 11, a Selsyn signal generator 23 in which the three equally spaced windings 28 are connected to the several windings 9, 10 and 11 on the inductor and operate in conjunction with a single winding 29. The windings 28 or the winding 29 is placed on or rotated with the vertical shaft 30 connected to the vertical ring 31 of the directional or slave gyroscope 32 while the other winding is stationary. As long as the windings 28 are placed in a certain relative angular position with respect to winding 29 as compared to the position of the windings 9, 10, and 11 in the earth's field, no signal is generated in the winding 29, but upon relative displacement from this relative position between the windings 28 and 9, 10, 11, an A. C. signal is generated in one direction or the other or, more strictly speaking, of one or the opposite phase. This signal we employ to coerce the directional gyroscope 32 to bring it into relative agreement with the compass. To this end, we have shown the signal from the winding 29 as led through an amplifier 33 and thence to opposed coils 34 and 35 on a polarized relay 36, the polarizing windings being shown at 37. Said winding is shown as excited from the same phase as the windings 8, but the frequency is doubled through any suitable form of frequency doubler 38 for the reasons explained in the aforesaid patent application of Lennox F. Beach. Excitation of the relay in one phase direction will close contact A and in the other direction contact B, which contacts are connected to the A. C. torque device 39 mounted on the vertical ring 31. The three windings 41, 42 and 43 of said device are preferably placed on the vertical ring, the squirrel cage rotor 44 being secured to one of the horizontal trunnions 50 on the gyro casing 45, two of the windings being connected at their outer ends to the aforesaid contacts A and B of the supply. Therefore, only two of the windings, 41 and 43 or 42 and 43 are excited at any one time, so that the device operates as a two-phase reversible induction motor. Fig. 3 also shows the three-phase spinning motor 46 connected to the three-phase supply.

It will be evident, therefore, that the compass card 47 on the vertical ring will indicate true compass directions in a steady manner since a torque will be exerted on the gyroscope to cause slow precession toward the meridian under all conditions except when the directional gyro card is in agreement with the magnetic meridian. Due to the integrating and slow wander effects of the gyroscope, the stabilization of the inductor compass, and the disconnection of the inductor compass during turns, a steady true compass indication is obtained.

As herein indicated, the flux valve is mounted on and to turn in azimuth with the craft. The directional gyro 32, however, may rotate about its vertical or azimuth axis relative to the craft as the craft turns and, of course, relative to the flux valve. Under these conditions and assuming that the gyro has not wandered but has maintained a predetermined orientation, the gyro should be free from any precessing torque. However, unless some compensating means were provided, a turning of the craft and flux valve in azimuth would provide an application of an undesired precessing torque to the gyro where the flux valve is employed, as in this invention. By relatively rotating the windings of the "Selsyn" generator 23 in accordance with turning of the craft and flux valve in azimuth, the electrical relationship of the windings is preserved and does not vary whereby no signal is supplied thereby to cause operation of the gyro-precessing or torque device 39, and therefore compensation for azimuthal rotation of the flux valve, alone, is accomplished. In the embodiment illustrated, the polyphase windings of the "Selsyn" generator are mounted to move in azimuth with the vertical ring of the gyro relative to the winding 29 which moves only in azimuth with the craft and flux valve. Hence, for all movements in azimuth of the flux valve, no operation of the gyro-precessing, torque device 39 will be effected unless the gyro wanders or deviates from its predetermined position of orientation. In the latter event, the electrical relationship of the windings 28 and 29 of the "Selsyn" will vary and the gyro will be caused to precess in a deviation-correcting direction.

While we have described our invention in its preferred embodiment, it is to be understood that the words which we have used are words of description rather than of limitation and that changes within the purview of the appended claims may be made without departing from the true scope and spirit of our invention in its broader aspects.

Having described our invention, what we claim and desire to secure by Letters Patent is:

1. A navigational instrument comprising a flux valve adapted to provide a signal output varying with azimuthal position of said valve, a directional gyro movable in azimuth relative to said valve, means for precessing said gyro about its azimuth axis, electrical means controlled by said flux valve for controlling said precessing means and including signal-responsive means for receiving the output from said flux valve and means for compensating for any change in the received output from said valve when azimuthal rotation only of said valve occurs, whereby a departure of said gyro from a predetermined azimuthal position will cause precession thereof.

2. A navigational instrument comprising a flux valve adapted to provide a signal output varying with azimuthal position of said valve, a directional gyro movable in azimuth relative to said valve, means for precessing said gyro about its azimuth axis, electrical means controlled by said flux valve for controlling said precessing means and including phase-sensitive means and signal-responsive means for receiving the output from said flux valve, and means for maintaining the phase relation of the received output from said valve to said phase-sensitive means substantially constant when azimuthal rotation only of said valve occurs, whereby a departure of said gyro from a predetermined azimuthal position will cause a departure-correcting precession thereof.

3. A navigational instrument comprising a flux valve adapted to provide a signal output varying with azimuthal position of said valve, a directional gyro movable in azimuth relative to said valve, means for precessing said gyro about its azimuthal axis, electrical means controlled by said flux valve for controlling said precessing means and including a pair of electrically cooperable, relatively movable elements, one of said elements being movable in azimuth with said flux valve, and one thereof being responsive to the signal output of said valve and the other being affected by a change in electrical relationship of said elements to effect an operation of said gyro-precessing means, and means controlled by said gyro for effecting relative movement of said elements when azimuthal rotation of said valve and one of said elements occurs whereby to preserve an electrical relationship of said elements while a departure of said gyro from a predetermined azimuthal position will cause a precession thereof.

4. A navigational instrument comprising a flux valve adapted to provide a signal output varying with azimuthal position of said valve, a directional gyro movable in azimuth relative to said valve, means for precessing said gyro about its azimuth axis, a receiver for the output from said flux valve, and means including means electrically responsive to said receiver for controlling said precessing means, said receiver and said means electrically responsive thereto being relatively movable and one thereof being movable in azimuth with said flux valve and the other being operatively connected with said gyro for orientation thereby.

5. A navigational instrument comprising a flux valve adapted to provide a signal output varying with azimuthal rotation of said valve, a directional gyro movable in azimuth relative to said valve, means for precessing said gyro about its azimuth axis, electrical means for controlling said precessing means including relatively movable, electrically cooperable elements, one of said elements being connected to receive the output from said flux valve and the other being responsive thereto and to the relative relationship thereof for controlling said precessing means, one of said elements being fixed in position relative to the other, and means for imparting movement to the other from an azimuthal precession of said gyro.

6. A navigational instrument comprising a flux valve adapted to provide a signal output varying with azimuthal rotation of said valve, a directional gyro movable in azimuth relative to said valve, means for precessing said gyro about its azimuth axis, means including a phase-sensitive device for controlling said precessing means, said device comprising relatively movable electrical elements, one thereof being arranged to receive the output from said flux valve and the other being responsive to a change in phase relationship of the received signal thereto to effect an operation of said gyro-precessing means, and means controlled by said gyro for relatively moving said elements when azimuthal rotation of said valve occurs whereby to preserve the phase relationship while a departure of said gyro from a predetermined azimuthal position will cause a departure-correcting precession thereof.

7. A navigational instrument for a craft comprising a flux valve fixed on said craft and movable in azimuth therewith and adapted to provide a signal output varying with azimuthal rotation thereof, a directional gyro movable in azimuth relative to said flux valve and craft, means for precessing said gyro about its azimuth axis, electrical means responsive to changes in output signal from said valve for controlling said precessing means and including means for receiving the output from said flux valve and means controlled by said gyro for compensating for any change in the received output from said valve when azimuthal rotation only of said valve occurs whereby a departure of said gyro from a predetermined azimuthal position will cause precession thereof.

8. A navigational instrument comprising a pendulously supported flux valve adapted to provide a signal output varying with azimuthal rotation thereof, a directional gyro movable in azimuth relative to said flux valve, means for precessing said gyro about its azimuth axis, electrical means responsive to changes in output signal from said valve for controlling said precessing means and including means for receiving the output from said flux valve and means controlled by said gyro for compensating for any change in the received output from said valve when azimuthal rotation only of said valve occurs whereby a departure of said gyro from a predetermined azimuthal position will cause precession thereof.

9. A navigational instrument comprising a flux valve adapted to provide a signal output varying with azimuthal rotation thereof, a directional gyro movable in azimuth relative to said flux valve, means for precessing said gyro and control means for said precessing means, said control means including a self-synchronous generator having two relatively movable windings, a first of said windings being connected to receive the output from said flux valve and one being fixed against azimuthal rotation relative to said flux valve and the other winding being movable relative thereto with an azimuthal rotation of said gyro whereby a control signal is generated in a second of said windings when a departure of said gyro from a predetermined azimuthal position occurs.

10. A navigational instrument for a craft comprising a flux valve fixed on said craft and movable in azimuth therewith and adapted to provide a signal output varying with azimuthal rotation thereof, a directional gyro movable in azimuth relative to said flux valve and craft, means for precessing said gyro about its azimuthal axis, and control means for said precessing means, said control means including a phase-sensitive, self-synchronous generator having relatively movable, polyphase and single phase windings, a first of said windings being connected to receive the output from said flux valve and one winding being fixed on said craft and movable in azimuth therewith and the other winding being movable in azimuth with said gyro whereby a control signal is generated in a second of said windings when a departure of said gyro from a predetermined azimuthal position occurs.

ORLAND E. ESVAL.
CARL A. FRISCHE.